G. M. STAPISH.
GATE.
APPLICATION FILED DEC. 19, 1916.

1,237,835.

Patented Aug. 21, 1917.

Inventor
G.M. Stapish

UNITED STATES PATENT OFFICE.

GEORGE M. STAPISH, OF CHEWELAH, WASHINGTON.

GATE.

1,237,835.   Specification of Letters Patent.   Patented Aug. 21, 1917.

Application filed December 19, 1916. Serial No. 137,817.

*To all whom it may concern:*

Be it known that I, GEORGE M. STAPISH, a citizen of the United States, residing at Chewelah, in the county of Stevens and State of Washington, have invented certain new and useful Improvements in Gates; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in gates and especially in the provision of a device of this nature so arranged that the gate may be adjusted to swing at different elevations, adapting the same for use to allow small live stock to pass through and so arranged as to permit the gate to swing free of snow or other obstructions.

I illustrate my invention in the accompanying drawings, in which:—

Figure 1:
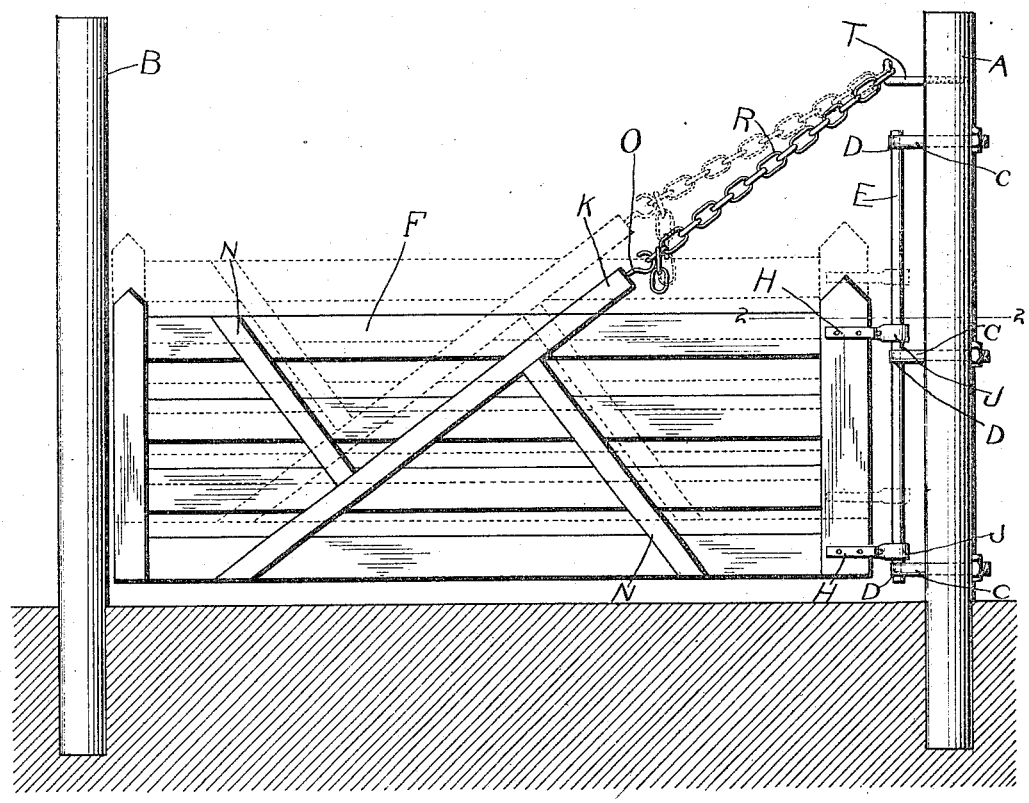
Figure 1 is a side elevation of a gate made in accordance with my invention.
Figure 2:
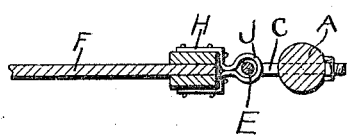
Fig. 2 is a sectional view on line 2—2 of Fig. 1.

Reference now being had to the details of the drawings by letters, A and B designate posts, the former of which is provided with rods C which have eyes D at their ends adapted to receive a vertically disposed rod E. The gate is designated by letter F and is provided with hinged members H fastened thereto and provided with eyes J which are mounted upon the rod E, serving to guide the hinged end of the gate as it swings. The rods C, which are fastened to the post A, serve as means for limiting the upward and downward movements of the gate.

Said gate is provided with a diagonally disposed brace bar K, and N designates other braces which are fastened to the gate at right angles to the brace K to which their inner ends are secured, thus reinforcing the gate and equally distributing the strain that comes upon the gate incident to its being held to swing in different elevations. A hook O is fastened to the end of the brace K which projects above the top board of the gate, and R designates a link chain, one end of which is designed to engage a hook T upon the post A, and said chain is adapted to be adjustably connected to the hook O accordingly as it may be desired to adjust the gate to swing at different elevations.

By the provision of a gate embodying the features of my invention, it will be noted that a simple means is provided whereby the weight of the gate is adapted to be supported by the chain while the inner end thereof swings upon the vertical rod. The gate, it will be noted, therefore, may be adjusted to permit sheep, hogs, etc., to pass underneath the same while animals of larger size will be prevented from passing through. The gate also may, by the adjustment set forth, be adjusted so that it will swing clear of any obstructions, such as snow, etc.

What I claim to be new is:—

In combination with a gate and posts, a vertically disposed rod fastened to one post and spaced apart therefrom, hinged members secured to the gate and having eyes through which said rod passes, said gate having a diagonally disposed brace bar secured thereto with additional brace bars secured at right angles to the diagonally disposed brace, a hook at the end of the latter and a hook upon the gate post, and a chain, the links of which are adapted to connect said hooks.

In testimony whereof I hereunto affix my signature in presence of two witnesses.

GEORGE M. STAPISH.

Witnesses:
 MARY E. WILLIAMS,
 IRA W. RHOADS.

Copies of this patent may be obtained for five cents each, by addressing the "Commissioner of Patents, Washington, D. C."